Patented Sept. 11, 1934

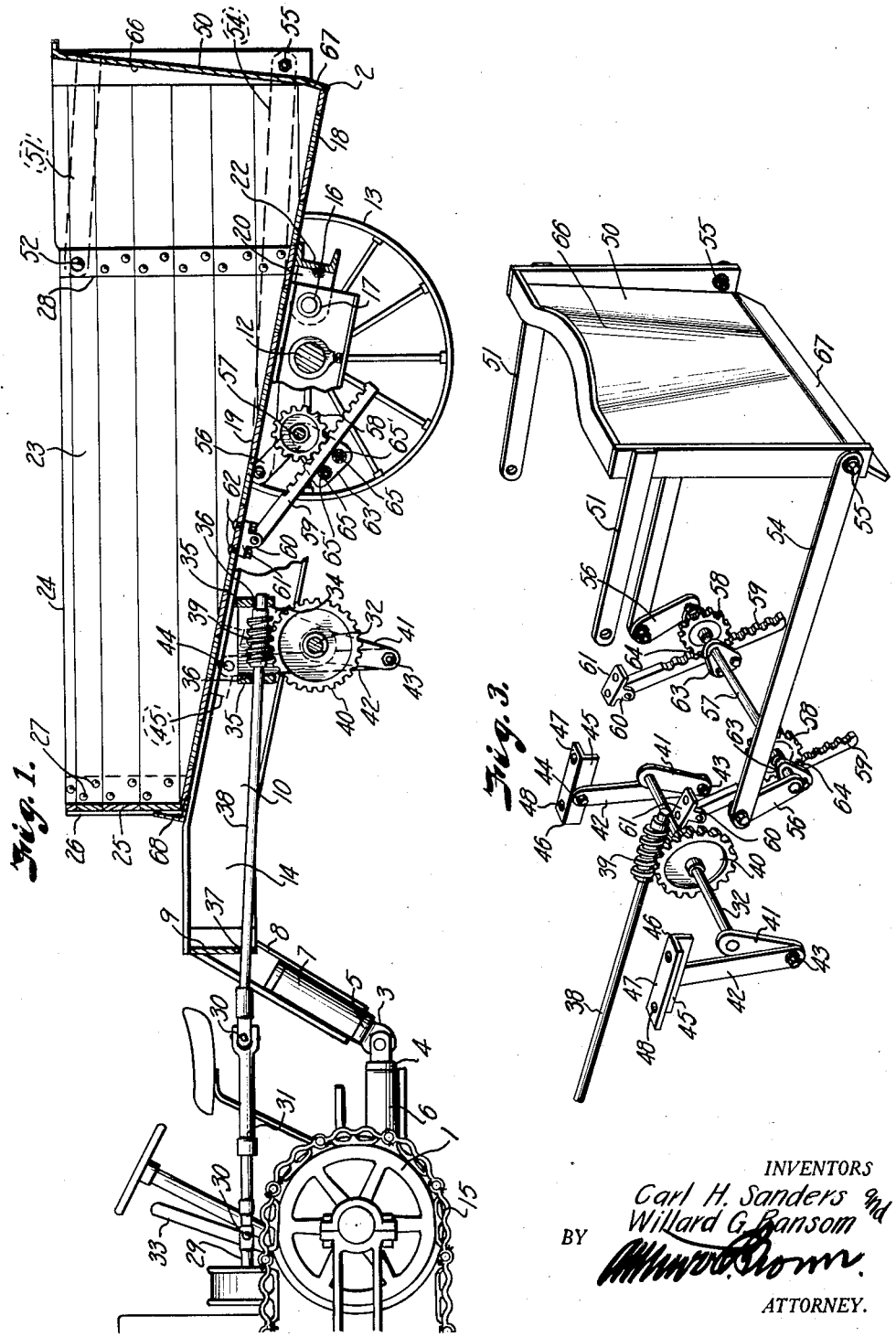

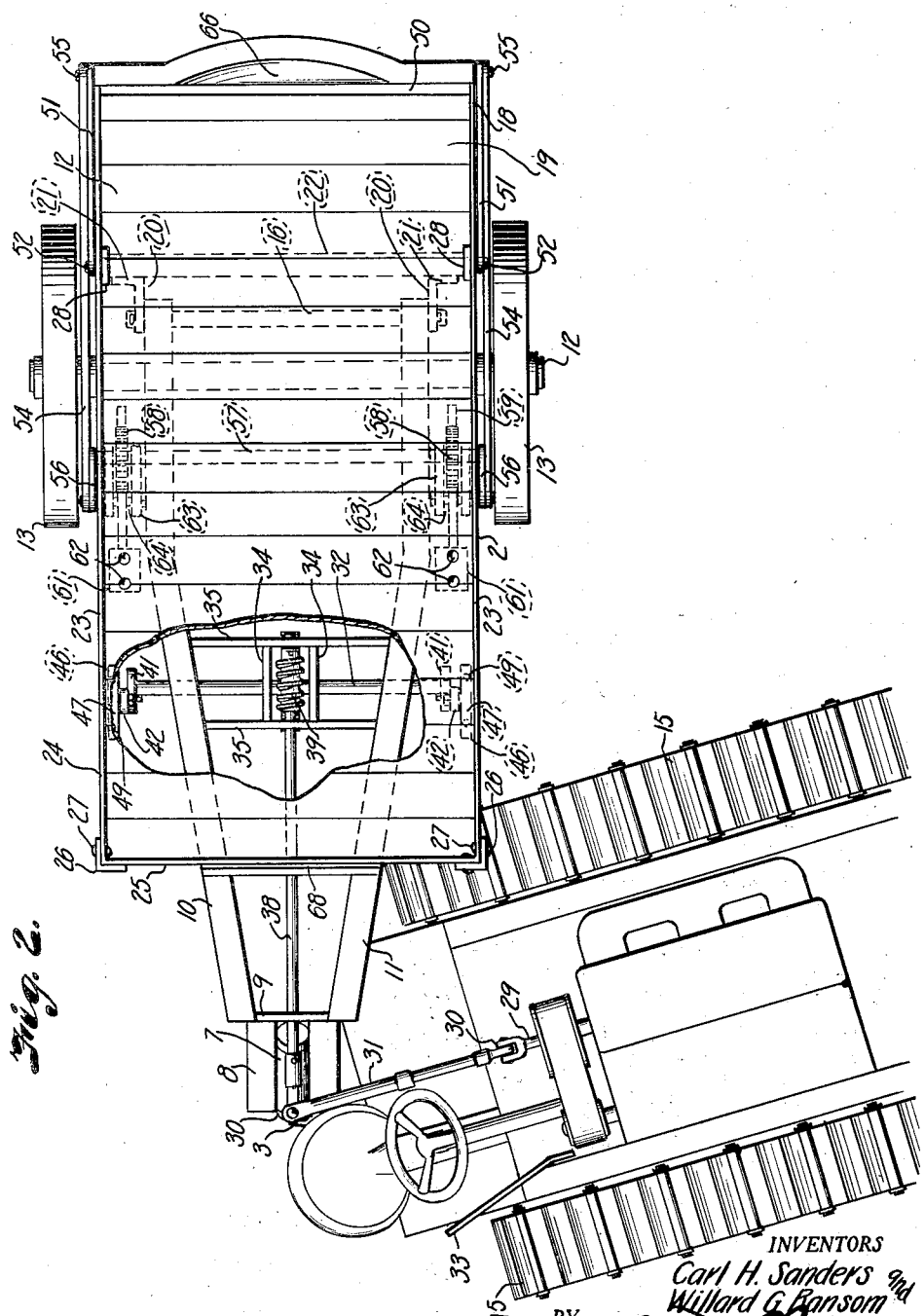

1,973,107

UNITED STATES PATENT OFFICE 1,973,107

DUMP CART

Carl H. Sanders and Willard G. Ransom, Ottawa, Kans., assignors of one-half to Cook & Ransom, Ottawa, Kans., a partnership composed of A. L. Cook, Sarah Cook, and W. G. Ransom Application April 11, 1932, Serial No. 604,502

4 Claims. (Cl. 298—19)

Our invention relates to vehicles and more particularly to dump carts adapted to be drawn by tractors for conveying loads in road grading and general construction work, the principal objects of the invention being to provide mechanism positively connected with the power take-off of a tractor for dumping the cart and simultaneously opening its discharge door, and to embody a frame in a cart of this character of such design as to permit a short turning radius of the coupled tractor and cart.

In accomplishing these and other objects of our invention, we have provided improved details of structure, the preferred form of which is disclosed in the accompanying drawings, wherein:

Fig. 1 is a central longitudinal section of a dump cart coupled to a tractor shown fragmentarily and in elevation, a portion of the cart frame being broken away to better disclose the mechanism for actuating a discharge door.

Fig. 2 is a plan view of the cart and tractor illustrating the short turning radius of the vehicles made possible by our invention, the floor of the cart being partially broken away to disclose portions of the dumping mechanism.

Fig. 3 is a perspective view of associated members of the dumping and door actuating apparatus.

Referring more in detail to the drawings:

1 designates a tractor of the caterpillar type commonly used for construction work and coupled to a dump cart generally designated 2 by a universal draft coupling 3 including horizontal and inclined shaft portions 4 and 5 journalled in cooperating bearing members 6 and 7.

The bearing member 7 is preferably secured between inclined channels 8 welded or otherwise secured to a front cross member 9 connecting the forward ends of spaced frame channels 10 and 11 of the cart.

As particularly shown in Fig. 1, an axle 12 is journalled in the frame members adjacent their rear ends or approximate center of gravity of the cart for mounting the frame on wheels 13 and the major portion of the frames incline forwardly and terminate in horizontal portions 14 having a lower surface in a plane above the traction members or caterpillar 15 of the tractor to permit a short turning radius of the coupled tractor and cart, as shown in Fig. 2.

Pivotally mounted on a transverse shaft 16 journalled in bearings 17 on the frame members is a dump body 18 having a rearwardly declined bottom 19 adapted to rest on the inclined portions of the frame members. The dump body is connected to the transverse shaft by bearing plates 20 mounted on the shaft and including lateral wings 21 secured to a cross channel 22 fixed to the lower surface of the bottom 19. The dump body further includes side walls 23 having horizontal upper edges 24, and a front wall 25, angle irons 26 being secured as by bolts 27 to the corners of the body and perpendicular plates 28 being similarly fixed to the side walls 23 for reinforcing the body.

In order to utilize the motive power of the tractor, for dumping the cart, a power take-off shaft 29 of the tractor is connected by a pair of universal joints 30 and a telescoping joint 31 to a dumping mechanism including a transverse shaft 32, actuation of the take-off being controlled at will of the operator by means such as a lever indicated at 33. The rear universal joint is substantially vertically aligned with the hinged point of the universal draft coupling as shown in Fig. 1 so that the tractor and cart can be turned sharply as clearly disclosed in Fig. 2.

The shaft 32 is rotatably carried in bearing plates 34 mounted between spaced supporting bars 35 having their outer ends secured to the frame members, and provided in the supporting bars at their approximate centers are openings 36 aligned with an opening 37 in the end cross plate 9 for receiving a driven shaft 38 connected to the rear universal joint and carrying a worm 39 on its portion located between the supporting bars. A worm gear 40 fixed to the transverse shaft 32 meshes with the worm gear for transmitting rotative movement of the driven shaft to the transverse shaft. Mounted on the outer ends of the transverse shaft 32 are crank arms 41 pivotally connected to the lower ends of links 42, as indicated at 43. The upper ends of the links are connected by bolts 44 to depending flanges 45 of angular plates 46 including lateral flanges 47 provided with openings 48 for receiving bolts or suitable fastening members 49 for securing the plates to the bottom of the dump body.

From the foregoing, it will be apparent that rotation of the driven shaft effects rotation of the transverse shaft 32, thereby rotating the crank arms about the shaft for elevating and lowering the front end of the dump cart.

In order, however, to simultaneously actuate a discharge door 50, adapted to close the rear open end of the body and pivotally mounted on the body by arms 51 secured to the door and having forward ends pivoted to the body, as at 52, we provide a door actuating mechanism 53, now to be described in detail.

A pair of arms 54 extending along the sides of the body and connected to the discharge door by bolts 55 are pivoted at their forward ends to cranks 56 fixed to a transverse shaft 57, and mounted on the shaft are spaced gears 58 adapted to mesh with gear racks 59 having upper ends mounted between the ears 60 of anchor plates 61 attached to the bottom of the body by bolts 62 or the like.

Means for retaining the racks in operable engagement with the gears 58 preferably include plates 63 having openings 64 for receiving the transverse shafts 57 and provided with rollers 65 mounted on pins 65' projecting laterally from the plates and adapted to engage the lower edges of the gear racks.

The door may further be provided with an outward bulge 66 to strengthen the door construction and to reduce the danger of losing rocks or boulders from the rear end of the load. The lower edge of the door preferably terminates in an inwardly directed lip 67 for abutting against the rear end edge of the bottom of the body, and a transverse angle member 68 is secured to the upper faces of the frame members for seating the forward end of the body when in loaded position.

Assuming a dump cart to be constructed as described and to be coupled and operably connected with the power plant of a tractor, its operation would be as follows.

When desiring to dump a load the power take-off shaft is operably connected with the power plant of the tractor by the lever 33 and upon rotation of the power shaft, the worm gear will be rotated by the worm 39 thereby actuating the cranks 41 for elevating the connecting links 42 to lift the forward end of the dump body. It will be apparent that upon elevation of this end of the body, the racks 59 rotate the gears mounted on the shaft 57 for operating the cranks 56 to thrust the lower end of the discharge door outwardly, thereby permitting discharge of the load from the body. Continued rotation of the worm gear and cranks 41 draws the front end of the body downwardly on the frame members and coincidently closes the discharge door. The power take-off is then disconnected from the power plant of the tractor and the cart is ready to be reloaded.

Due to the inclination of the frame members and the elevated condition of the forward end of the cart frame, a very short turning radius of the coupled vehicles is made possible which is particularly advantageous in grading and general construction work. The inclination of the cart bottom also facilitates unloading of the cart as will be obvious, and the pressure of the load against the door upon dumping movement of the cart will have a tendency to assist in dumping the cart thereby reducing the strain on the power take-off mechanism to an extent equal to the pressure on the door times the combined lever and gear ratio.

By stopping the power take-off at a given point the position of the dump body and the degree of opening of the door will become fixed and the load, in moving the cart, can be spread in a layer of desired thickness. The door may also be used as a scraper for leveling a load as it is discharged from the cart.

Since some tractors are equipped with a reversible power take-off, it will be apparent that with the use of such tractors, the worm gear need not be entirely rotated, but may be turned in either direction to the necessary extent for moving the body to a proper position for loading and unloading.

What we claim and desire to secure by Letters Patent is:

1. In combination with a tractor having a power take-off and traction members, a dump cart having a forwardly inclined and converging frame to clear the traction members when making a turn with the tractor and cart, means for coupling the cart to the tractor, dumping mechanism on the cart, and a shaft in a substantially horizontal plane above the traction members and including telescoping sections operatively connecting the dumping mechanism with the power take-off.

2. In combination with a tractor having a power take-off and traction members, a dump cart having a forwardly inclined frame terminating in a substantially horizontal portion having a lower surface in a plane above the traction members, means for coupling the cart to the tractor, dumping mechanism on the cart, and a shaft in a plane above the traction members and including telescoping sections and a universal joint for operatively connecting the dumping mechanism with the power take-off.

3. In combination with a tractor having a power take-off and traction members, a dump cart having a forwardly inclined frame to clear the traction members when making a turn with the tractor and cart, means including a hinged joint for coupling said cart to the tractor, dumping mechanism on the cart, a shaft in a plane above said coupling, means including a universal joint having its pivotal axis substantially vertically aligned with said hinged joint for operably connecting said dumping mechanism with the power take-off for dumping the cart.

4. In combination with a tractor having a power take-off and traction members, a dump cart having a forwardly inclined frame to clear the traction members when making a turn with the tractor and cart, means including a hinged joint for coupling said cart to the tractor, dumping mechanism on the cart, a shaft in a substantially horizontal plane above the traction members, a universal joint on the shaft having its pivotal axis substantially vertically aligned with said hinged joint, and a shaft connecting the universal joint with the power take-off to operate the dumping mechanism.

CARL H. SANDERS.
WILLARD G. RANSOM.